United States Patent [19]

Blunden

[11] Patent Number: 4,679,974
[45] Date of Patent: * Jul. 14, 1987

[54] VEHICLE CHOCK BLOCK APPARATUS FOR RAILROAD CAR TRANSPORT OF VEHICLES

[75] Inventor: Donald J. Blunden, Plymouth, Mich.

[73] Assignee: Thrall Car Manufacturing Company, Chicago Heights, Ill.

[*] Notice: The portion of the term of this patent subsequent to Jun. 23, 2004 has been disclaimed.

[21] Appl. No.: 792,306

[22] Filed: Oct. 28, 1985

[51] Int. Cl.[4] ........................... B60P 3/07; B60T 3/00
[52] U.S. Cl. ...................................... 410/30; 188/36; 410/26
[58] Field of Search .................... 410/7–12, 410/19, 24, 26, 30; 188/36; 105/378; 206/335

[56] References Cited

U.S. PATENT DOCUMENTS 1,778,162  10/1930  Mills et al. ............................. 410/30
3,673,969   7/1972  Peisner et al. ......................... 410/12

FOREIGN PATENT DOCUMENTS 967798  8/1964  United Kingdom .................. 410/26

Primary Examiner—Randolph A. Reese
Attorney, Agent, or Firm—Marshall, O'Toole, Gerstein, Murray & Bicknell

[57] ABSTRACT

A railroad car having at least one deck for supporting and transporting four-wheel vehicles such as automobiles and trucks, having a pair of spaced apart first and second parallel tracks, secured to the deck longitudinally of the railroad car, having clearance for the wheels on one side of the vehicle to roll between the tracks; a pair of movable chock block apparatus for each vehicle transported on the deck to secure the vehicle against longitudinal movement; each chock block apparatus including a bar with a first end and a second end; a carriage permanently secured to the first track so it cannot be removed from the first track but so it can be moved along the longitudinal axis of the first track without rotation about a vertical axis; the bar first end being connected to the carriage so the bar first end can rotate about a substantially vertical axis at least about 90°; the carriage being releasably securable in a fixed position along the first track; and the bar second end being releasably securable in a fixed position along the second track.

12 Claims, 12 Drawing Figures

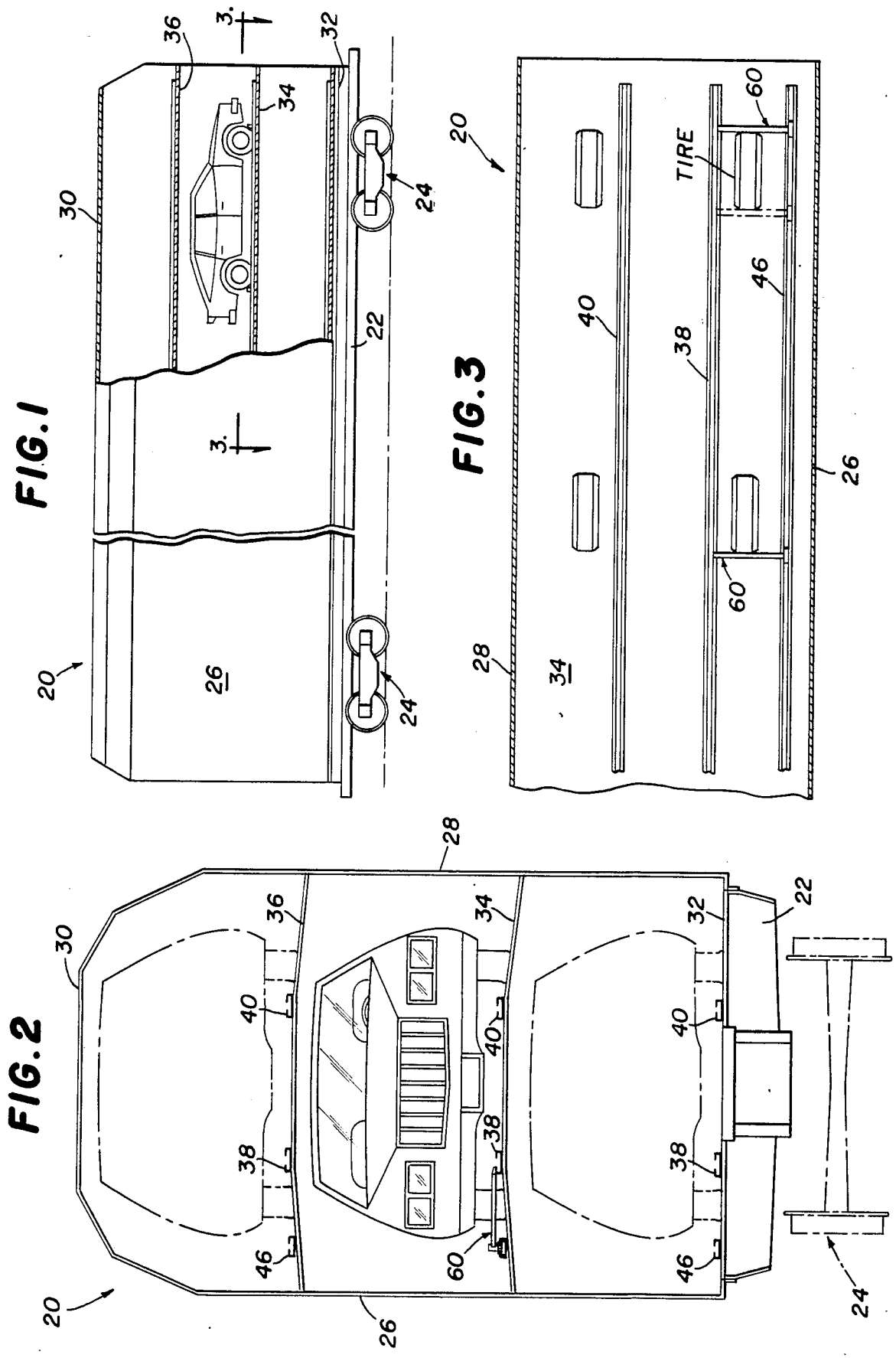

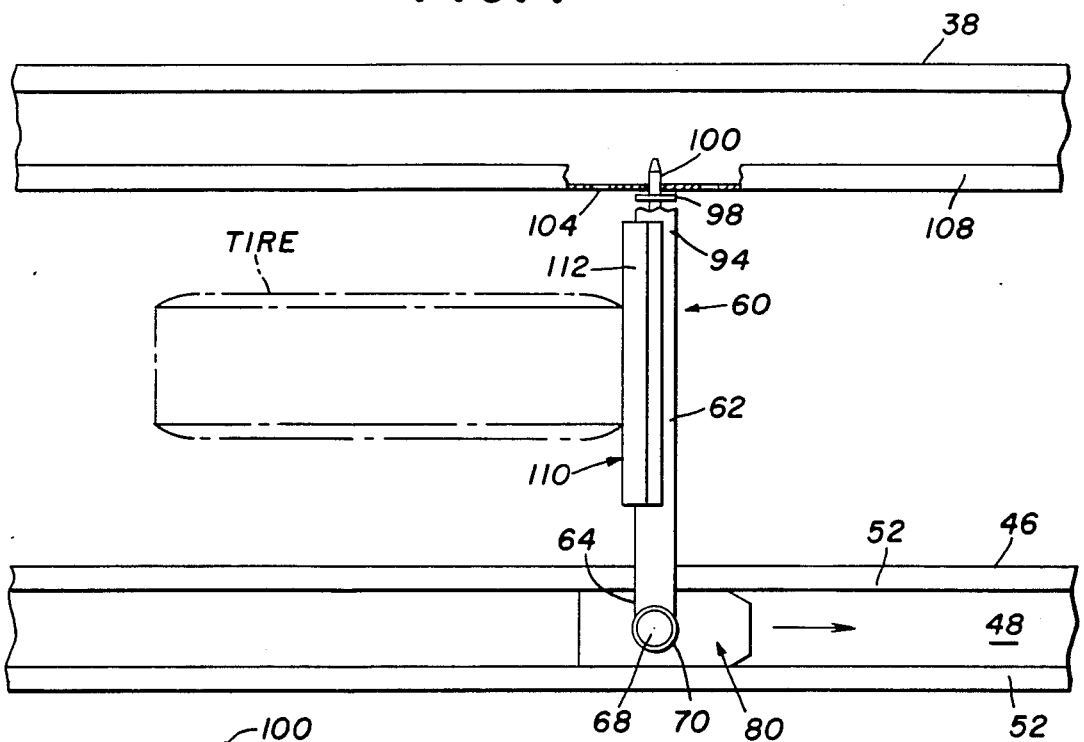
FIG. 4
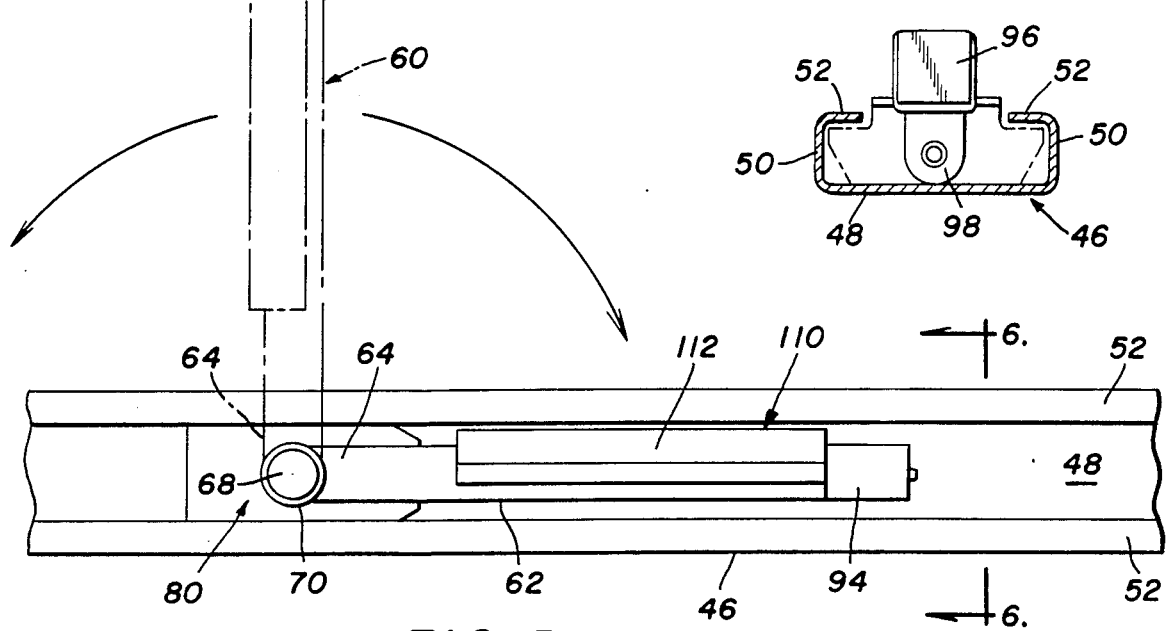
FIG. 5
FIG. 6

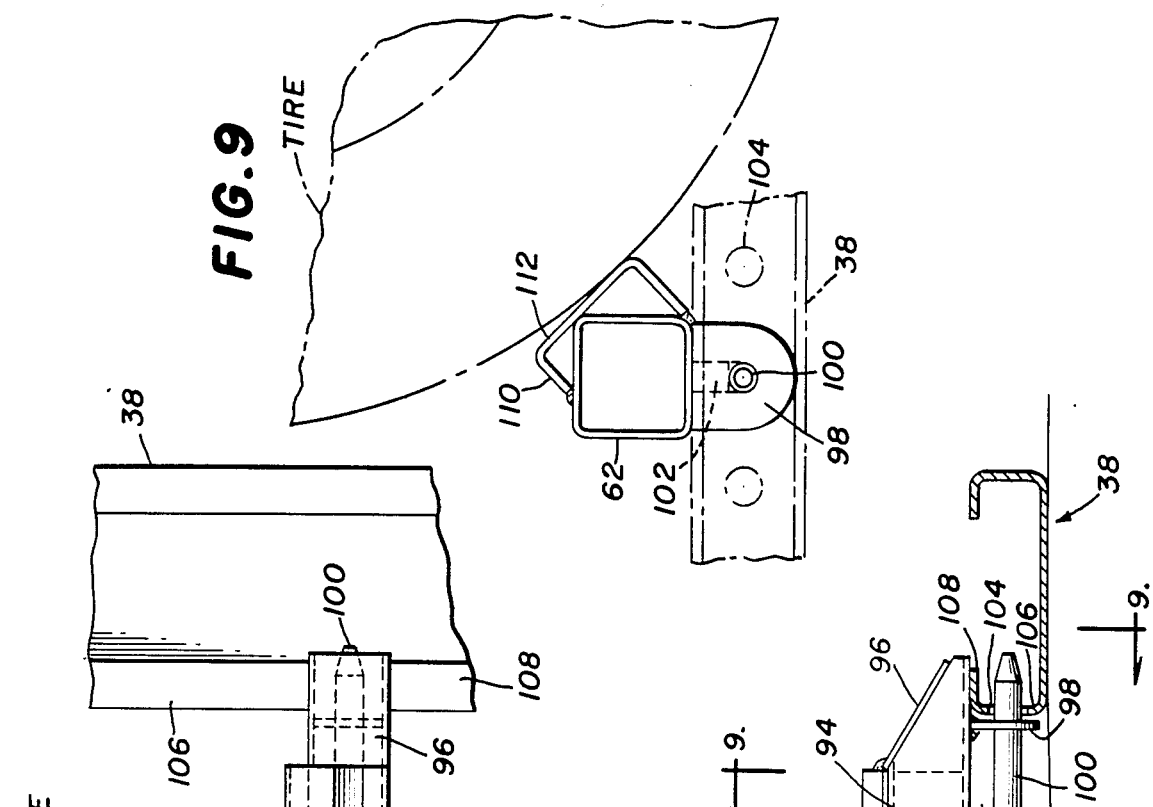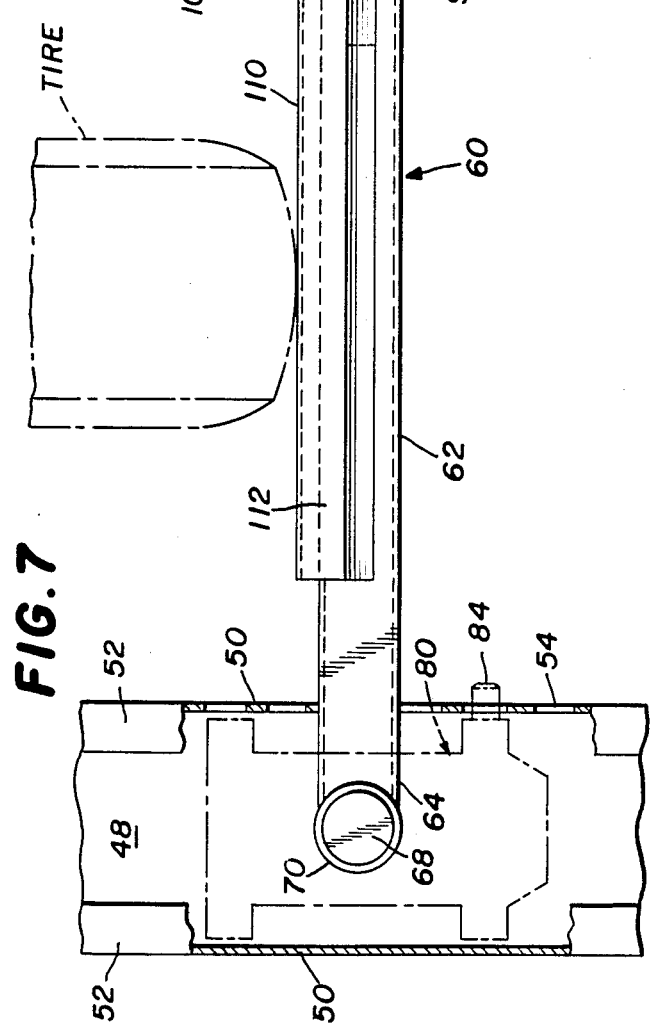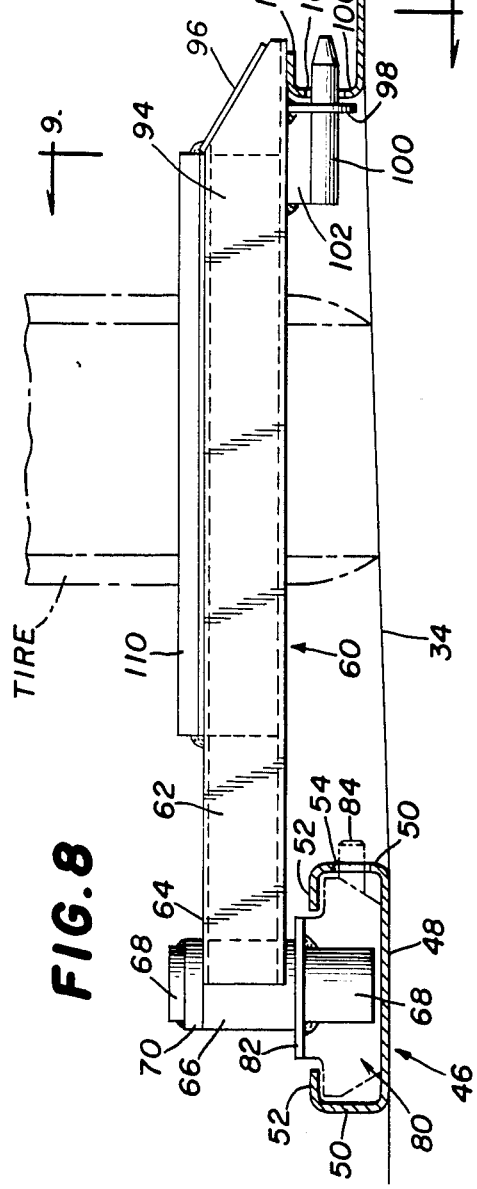

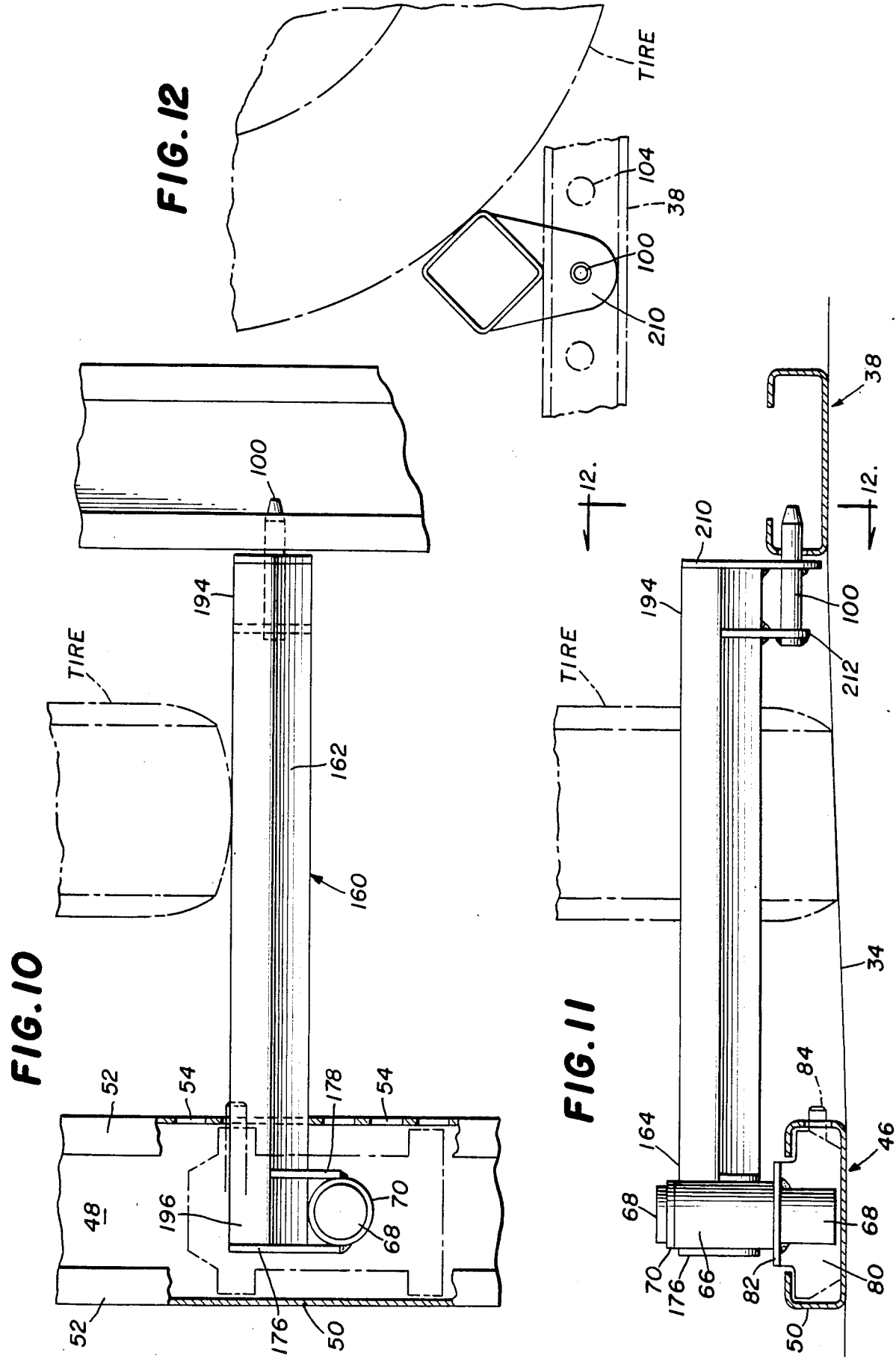

VEHICLE CHOCK BLOCK APPARATUS FOR RAILROAD CAR TRANSPORT OF VEHICLES

This invention relates to railroad cars used to transport vehicles such as automobiles and trucks. More particularly, this invention is concerned with improved chock block apparatus for securing vehicles being transported on such railroad cars.

BACKGROUND OF THE INVENTION

Special railroad cars are used to transport vehicles such as automobiles and trucks from manufacturing plants to distribution centers. Such railroad cars are often referred to as auto rack cars. The number of decks which support the vehicles depends on the type of vehicles to be transported. Although some cars have a single deck it is more common to have two or three decks. Each deck will usually carry about four to six vehicles in the United States.

It is necessary to tie down or secure each vehicle to its supporting deck so that it remains in position while the railroad car moves from its point of loading to its destination. The system used to tie down each vehicle must be able to hold it securely even when the railroad car is subjected to buff and draft forces as well as when it rocks, rolls and bumps.

One of the ways widely used in the United States to tie down vehicles requires a pair of parallel tracks, spaced apart about forty inches outside, on each deck. The four wheels of each vehicle span the tracks and thus provide centering guides when the vehicles are driven onto the railroad car in column formation in so-called circus loading. After a vehicle is properly positioned on a deck it is pulled down tightly by use of four chains. Two chains are used at each end. Each chain free end is hooked to the vehicle frame or body adjacent the track. The chain extends downwardly to a carriage releasably slidable in the track and carrying a winch for tightening the chain. Such apparatus is disclosed in U.S. Pat. Nos. 3,566,803; 3,564,577; 3,374,008 and 3,673,969.

Although the described tie down apparatus has been successfully used for many years, recent vehicle structural changes have lowered road clearance, indicating that alternative systems should be used. Thus, it is no longer desirable to use a tie down system which pulls the body down and compresses the vehicle springs because this lowers the clearance between the vehicle underbody parts including mufflers, tailpipes and the like, and the deck. When the railroad car bumps and pitches, it can hit the deck and cause damage to the vehicle. Additionally, to withstand the tension applied to the underbody of the vehicle where the hooks are attached, special reinforcement must be added with increased cost solely to transport the vehicle and with no general benefit to the vehicle once it reaches its destination.

A further disadvantage of the prior art tie down system is that the laborer must have access to both sides of the vehicle; thus, space must be provided for him to work and walk on both sides. For some vehicles it is considered that tie down on one side only would be adequate if a suitable system is available. This would reduce the laborers time and lower costs.

Another disadvantage is use of a winch to tension the chain since it requires that the laborer carry a crank with him to operate the winch. Since only a narrow path is present on each side of the vehicle, it is quite common for the laborer to accidently strike the vehicle with the crank as he walks along and dent the body or chip the paint thereby making the vehicle unattractive to a buyer.

From the above discussion it is believed clear that alternative tie down apparatus for vehicles transported by railroad car which eliminate some or all of the disadvantages of the prior art systems is needed.

SUMMARY OF THE INVENTION

According to the invention, a railroad car is provided having at least one deck for supporting and transporting four-wheel vehicles such as automobiles and trucks; a pair of spaced apart first and second parallel tracks, secured to the deck longitudinally of the railroad car, having clearance for the wheels on one side of the vehicle to roll between the tracks; a pair of movable chock block means for each vehicle transported on the deck to secure the vehicle against longitudinal movement; each chock block means including a bar with a first end and a second end; a carriage permanently secured to the first track so that it cannot be removed from the first track but so that it can be moved along the longitudinal axis of the first track without rotation about a vertical axis; means connecting the bar first end to the carriage so that the bar first end can rotate about a substantially vertical axis at least about 90°; the carriage having means for releasably securing the carriage in a fixed position along the first track; and the bar second end having means for releasably securing the bar second end in a fixed position along the second track.

A vehicle is secured in place by at least (1) laterally positioning a bar in front of a wheel and another bar in back of the same wheel, (2) laterally positioning a bar in front of one wheel and laterally positioning another bar in back of the other wheel on the same side of the vehicle and with both bars located between the wheels, or (3) positioning the bars as in (2) but outside the wheels. If desired, wheels on both sides of the vehicle can be secured in place in the same way. Also, all four wheels can be individually secured in place by bars in front and in back of each wheel.

The means which secures the bar first end to the track can include a pair of telescoped vertical members, one of which is connected to the carriage and the other of which is connected to the bar first end. The pair of vertical members may comprise a pin joined to the carriage and a sleeve joined to the bar, with the pin and sleeve fixed against significant vertical displacement relative to each other.

The first track can be a channel member with inwardly directed horizontal flanges at the top which terminate in spaced apart position and define a longitudinal gap; and the means which secures the bar first end to the first track can include a pair of telescoping vertical members, one of which vertical members being connected to the carriage and extending through the channel member gap and with the other vertical member being connected to the bar first end.

The second track can have a series of spaced-apart holes; and the bar second end means for releasably securing the bar second end in a fixed position along the second track can include at least one pin which engages a hole in the second track.

The second end of the bar can have means which engages the first track when the bar is parallel to the track to thereby stow the bar out of the way so vehicles can roll unobstructed on the deck.

The means for releasably securing the carriage in a fixed position along the first track can comprise a movable pin mounted on the carriage; a plurality of holes in and along the first track; and means to move a portion of the pin into one of the holes in the first track.

BRIEF DESCRIPTION OF THE DRAWINGS

FIG. 1 is a side elevation of a railroad car having chock block apparatus connected to two tracks on the car decks according to the invention;

FIG. 2 is an end view of the railroad car shown in FIG. 1;

FIG. 3 is a sectional view of FIG. 1 taken along the line 3—3;

FIG. 4 is a plan view of one embodiment of chock block apparatus, according to the invention, connected to two tracks on a railroad car deck and abutting a vehicle tire;

FIG. 5 is a plan view showing the chock block apparatus of FIG. 4 in stowed position;

FIG. 6 is a sectional view of FIG. 5 taken along the line 6—6;

FIG. 7 is an enlarged plan view of the chock block apparatus shown in FIGS. 4 to 6;

FIG. 8 is a side elevational view of FIG. 7;

FIG. 9 is a sectional view of FIG. 8 taken along the line 9—9;

FIG. 10 is a plan view, similar to FIG. 7, of a second embodiment of chock block apparatus connected to two tracks on a railroad car deck according to the invention;

FIG. 11 is a side elevational view, partially in section, of the chock block apparatus shown in FIG. 10; and FIG. 12 is an elevational view, partially in section, of FIG. 11 taken along the line 12—12.

DETAILED DESCRIPTION OF THE DRAWINGS

To the extent it is reasonable and practical the same or similar elements or parts which appear in the various views of the drawings will be identified by the same numbers.

With reference to FIGS. 1 to 3, the railroad car 20 has an underframe 22 supported by a pair of wheel trucks 24. Extending upwards from underframe 22 are sidewalls 26,28 to which roof 30 is connected.

The railroad car 20 has three decks 32,34 and 36. Deck 32 is supported on underframe 22 and decks 34 and are supported by column members, not shown, along the sides of the car 20. The height between adjacent decks and between the top deck 36 and the car roof 30 is approximately equal.

The railroad cars now used in the United States to transport vehicles generally have two spaced apart longitudinal tracks 38,40 (FIGS. 1 to 3) on each deck for use in securing vehicles in place. They are spaced about forty inches apart, outside dimension, so that they lie between the pair of wheels on each side of the vehicles. At least one of these tracks is suitably employed with the chock block apparatus provided by the invention. For convenience, track 38 is selected and in the subsequent description the invention will be discussed primarily with respect to it. It should be understood, however, that in new railroad cars, track 38 can be a new track and that track 40 may or may not be included.

As shown in FIGS. 4 and 5, a track 46 is positioned on each deck 32,34,36. Each track 46 is located parallel to and spaced outwardly of track 38 so as to provide a wide enough path between tracks 38 and 46 for a pair of wheels on one side of vehicles with different tread spans to roll along the deck. Track 46 is channel shaped (FIG. 6) with a flat bottom 48, side walls 50 and inwardly directed horizontal top flanges 52 which terminate in edges spaced apart from each other, thereby defining a longitudinal gap. The side walls 50 have spaced apart horizontal holes 54 located side-by-side in a straight line.

A chock block apparatus 60 is secured to track 46 so that it is not readily removable therefrom but so that it can be moved along the longitudinal axis of the track and be rotated clockwise or counterclockwise from about lateral to about parallel to track 46 (FIGS. 4 to 6). The chock block apparatus 60 includes a bar 62. The bar 62 is shown as a tube which is square in lateral section and set with the top and bottom horizontal. A first end 64 of bar 62 is joined to vertical circular stub tube 66 which fits loosely over vertical pipe 68 so that the arm 62 can rotate freely in either direction in a complete circle (FIGS. 7 and 8). A ring 70 (FIG. 8) is placed on the upper end of pipe 68 and is welded to it to prevent removal of stub tube 66.

A carriage 80 is slidably positioned inside of track 46 beneath flanges 52. Carriage 80 is not intended to be removed from the track. The structure of carriage 80 is disclosed in detail in U.S. Pat. No. 3,673,969, the disclosure of which is incorporated herein by reference. The carriage 80 has a top 82 to which pipe 68 is joined so that the pipe cannot move independent of the carriage. The carriage 80 is also provided with a hand operated springloaded latch or locking pin 84 which engages with a hole 54 in track 46. The pin 84 in unlocked position is held withdrawn from hole 54 by a retaining means, not shown but which is fully disclosed in U.S. Pat. No. 3,673,969, when the carriage is to be slid in track 46.

The second end 94 of bar 62 is sloped downwardly and covered by plate 96. Extending downwardly from the bottom of tube 62 is a vertical plate 98 which supports horizontal pin 100. Vertical plate 102 extends between, and is joined to, pin 100 and the bottom of tube 62 thereby providing further support for the pin (FIGS. 8 and 9). Pin 100 projects outwardly past plate 98 for a distance sufficient to extend into any one of the holes 104 in the wall 106 of track 38. With the pin 100 so positioned, the bottom of bar 62 rests on flange 108 of track 38.

A tire contacting channel-shaped member 110 (FIGS. 7 to 9) is attached to the top of bar 62 so that the channel top face 112 is at an angle of about 45° from the horizontal to thereby provide a flat surface against which a vehicle tire can press.

The described chock block apparatus 60 is shown in position of use in FIG. 4. To remove the apparatus from use, pin 84 is first withdrawn from hole 54. The first end 64 of bar 62 is then moved away from the tire by sliding it along track 46 in the direction of the arrow for a sufficient distance to withdraw the end of pin 100 from a hole 104. With the pin 100 freed from the hole, further sliding of the first end 64 along the track causes bar 62 to move away from the tire and causes end 96 to move counterclockwise toward the track 46. End 96 can then be lifted and placed in stowed position in track 46. After being released, the bar 62 also can be rotated clockwise into stowed position, as shown in FIG. 5. As shown in FIG. 6, when the chock block apparatus 60 is in stowed position the bottom portions of plate 98 fit into the gap between flanges 52 of track 46 and prevents the bar 62 from swinging out. The chock block apparatus is placed in use to secure a vehicle in place by reversing the described operations.

Because of the presence of tire-contacting member 112, when the same wheel or tire is chocked fore and aft, or when two tires on the same side of a vehicle are chocked with one bar 62 per tire placed fore with respect to one tire and aft with respect to the other tire, the chock block apparatus is used in a left and right pair.

Generally, at least two of the described chock block apparatus 60 are connected to track 46 and used to secure a vehicle in place on a railroad car deck. The vehicle tires can be chocked only on one side of the vehicle or on both sides and respective tires can be chocked only in front or back, or both in front and back, in any combination considered suitable to hold the vehicle in place. It should be understood that to chock a vehicle on both sides that another track 46 must be positioned outwardly of track 40 and one or more chock block apparatus 60 connected thereto.

FIGS. 10 to 12 illustrate a second embodiment of chock block apparatus 160 which operates substantially like the already described first embodiment 60. Additionally, elements common to both embodiments will not be described again with respect to the second embodiment.

The chock block apparatus 160 includes a bar 162, of square tubular shape, having a first end 164 and a second end 194. The first end 164 is secured to the side of tube 66 by plates 176 and 178. Bar 162 is set on edge as shown more clearly in FIG. 12 thereby providing a flat surface for the tire to contact.

The second end 194 of bar 162 has a vertical plate 210 joined to it. Plate 210 and plate 212 together support pin 100 (FIG. 11). Pin 100 extends through a hole in plate 210 for a distance sufficient to project through a hole 104 in track 38 (FIG. 11). When so positioned the second end of the chock block apparatus 160 is secured in place for use of the apparatus to hold a vehicle in place.

Although the apparatus 160 operates like the first embodiment 60, it has one additional beneficial feature. By offsetting the bar 162 from vertical telescoped members, the bar 162 when rotated 90° can provide additional clearance either for ease in walking down the side of the railroad car or to the automobile itself.

The described chock block apparatus 160 is used and removed and stowed in the same manner as already described above in connection with apparatus 60.

The foregoing detailed description has been given for clearness of understanding only, and no unnecessary limitations should be understood therefrom, as modifications will be obvious to those skilled in the art.

What is claimed is:

1. A railroad car having at least one deck for supporting and transporting four-wheel vehicles such as automobiles and trucks;
a pair of spaced apart first and second parallel tracks, secured to the deck longitudinally of the railroad car, having clearance for the wheels on one side of the vehicle to roll between the tracks;
a pair of movable chock block means for each vehicle transported on the deck to secure the vehicle against longitudinal movement;
each chock block means including a substantially horizontal bar with a first end and a second end;
a carriage permanently secured to the first track so that it cannot be removed from the first track but so that it can be moved along the longitudinal axis of the first track without rotation about a vertical axis;
means connecting the bar first end to the carriage so that the bar first end can rotate about a substantially vertical axis at least about 90°;
the carriage having means for releasably securing the carriage in a fixed position along the first track;
the bar second end having means for releasably securing the bar second end in a fixed position along the second track wherein release of the bar second end from fixed position along the second track requires displacement of the bar first end along the first track for a short distance and securing the bar second end in fixed position along the second track requires displacement of the bar first end along the first track for a short distance.

2. A railroad car according to claim 1 wherein:
the means which secures the bar first end to the track includes a pair of telescoped vertical members one of which is connected to the carriage and the other of which is connected to the bar first end.

3. A railroad car according to claim 2 in which the pair of vertical members is a pin joined to the carriage and a sleeve joined to the bar and the pin and sleeve are fixed against significant vertical displacement relative to each other.

4. A railroad car according to claim 1 wherein:
the first track is a channel member with inwardly directed horizontal flanges at the top which terminate in spaced apart position and define a longitudinal gap; and
the means which secures the bar first end to the first track includes a pair of telescoping vertical members, with one of the vertical members being connected to the carriage and extending through the channel member gap and with the other vertical member being connected to the bar first end.

5. A railroad car according to claim 1 in which:
the second track has a series of spaced-apart holes; and
the bar second end means for releasably securing the bar second end in a fixed position along the second track includes at least one pin which engages a hole in the second track.

6. A railroad car according to claim 1 in which the second end of the bar has means which engages the first track when the bar is parallel to and on top of the track.

7. A railroad car according to claim 1 in which the means for releasably securing the carriage in a fixed position along the first track comprises:
a movable pin mounted on the carriage;
a plurality of holes in and along the first track; and
means to move a portion of the pin into one of the holes in the first track.

8. A railroad car according to claim 1 in which:
the second track has a series of spaced-apart holes;
the bar second end means for releasably securing the bar second end in a fixed position along the second track includes at least one pin which engages a hole in the second track;
the bar second end being adapted to rest on top of the second track; and
the pin being horizontal and positioned beneath and longitudinal to the bar second end.

9. A railroad car having at least one deck for supporting and transporting four-wheel vehicles such as automobiles and trucks:
- a pair of spaced apart first and second parallel tracks, secured to the deck longitudinally of the railroad car, having clearance for the wheels on one side of the vehicle to roll between the tracks;
- the first track being a channel member with inwardly directed horizontal flanges at the top which terminate in spaced apart position and define a longitudinal gap;
- the second track having a series of spaced-apart holes;
- a pair of movable chock block means for each vehicle transported on the deck to secure the vehicle against longitudinal movement;
- each chock block means including a bar with a first end and a second end;
- a carriage permanently secured to the first track so that it cannot be removed from the first track but so that it can be moved along the longitudinal axis of the first track without rotation about a vertical axis;
- the carriage having means for releasably securing the carriage in a fixed position along the first track;
- means connecting the bar first end to the carriage so that the bar first end can rotate about a substantially vertical axis at least about 90°;
- the means which secures the bar first end to the first track including a pair of telescoping vertical members, with one of the vertical members being connected to the carriage and extending through the channel member gap and with the other vertical member being connected to the bar first end;
- the bar second end having means for releasably securing the bar second end in a fixed position along the second track, including at least one pin which engages a hole in the second track wherein said pin is fixedly secured to said bar second end and substantially horizontal thereto so that release of the bar second end from fixed position along the second track requires displacement of the bar first end along the first track for a short distance and securing of the bar second end in fixed position along the second track requires displacement of the bar first end along the first track for a short distance.

10. A railroad car according to claim 9 in which the pair of vertical members is a pin joined to the carriage and a sleeve joined to the bar and the pin and sleeve are fixed against significant vertical displacement relative to each other.

11. A railroad car according to claim 9 in which the second end of the bar has means which engages the first track when the bar is parallel to and on top of the track.

12. A railroad car according to claim 8 in which the means for releasably securing the carriage in a fixed position along the first track comprises:
- a movable pin mounted on the carriage;
- a plurality of holes in and along the first track; and
- means to move a portion of the pin into one of the holes in the first track.

* * * * *

UNITED STATES PATENT AND TRADEMARK OFFICE
CERTIFICATE OF CORRECTION

PATENT NO. : 4,679,974

DATED : July 14, 1987

INVENTOR(S) : Donald Jack Blunden

It is certified that error appears in the above-identified patent and that said Letters Patent is hereby corrected as shown below:

Column 3, line 51, after "and" insert -- 36 --; column 8, line 24, change "8" to -- 9 --.

Signed and Sealed this

Third Day of November, 1987

Attest:

DONALD J. QUIGG

Attesting Officer

Commissioner of Patents and Trademarks